Patented Aug. 27, 1946

2,406,329

UNITED STATES PATENT OFFICE 2,406,329

AMINO-CARBOXYLIC ACID ESTERS OF MONOGLYCERIDES

Benjamin R. Harris, Chicago, Ill.

No Drawing. Application February 5, 1941,
Serial No. 377,487

3 Claims. (Cl. 260—404)

This invention relates to the preparation of new chemical compounds which are especially useful for antiseptic, medicinal, preservative, bactericidal, bacteriostatic, germicidal and fungicidal purposes.

At least many of the novel substances of the present invention, which, in use, are employed particularly in the form of salts such as hydrochlorides, as hereinafter set forth, fall within the scope of the general formula:

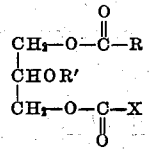

wherein

is an acyl radical,

is the acyl radical of an amino-carboxylic acid containing at least one primary amino group, and R' is hydrogen or the acyl radical of an amino-carboxylic acid.

The novel substances of the present invention, generally used in the form of their salts as indicated hereinabove, may be regarded as amino-carboxylic acid esters of monoglycerides, particularly monoglycerides of higher molecular weight fatty acids, especially satisfactory being those derived from fatty acids containing from eight to fourteen carbon atoms.

In order that the nature of the invention may become more apparent, there are listed hereinbelow various of the novel substances which generally are used in the form of salts, especially, hydrochlorides, and fall within the scope of the invention:

(1)
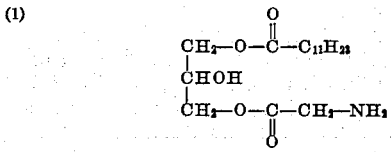

(2)
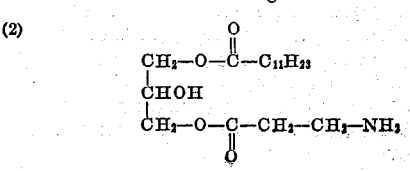

(3)
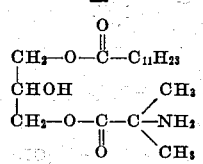

(4)
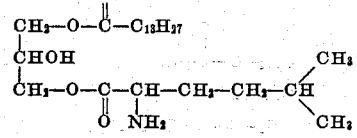

(5)
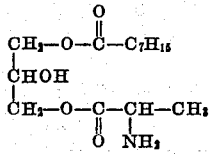

(6)
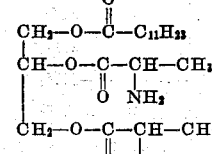

(7)
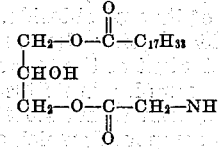

(8)
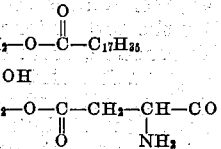

(9)
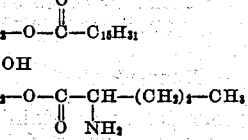

(10)
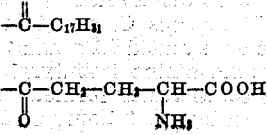

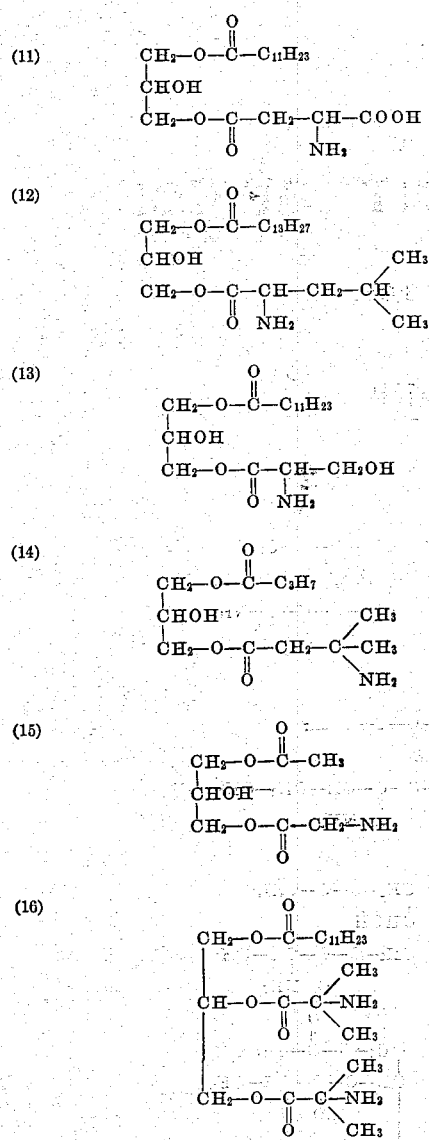

The substances are prepared, preferably, by converting the amino-carboxylic acid into its acyl chloride or a salt of its acyl chloride, such as the hydrochloride, and reacting the same with the stoichiometric equivalent of the monoglyceride.

The following examples are illustrative of a method which has been found suitable for preparing the various compounds which are disclosed herein. It will be appreciated that other methods may be utilized, that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

Example A 5.4 grams of monostearin (containing approximately 96.8% of monostearin and 3.2% of free stearic acid) were dispersed in 35 cc. of chloroform at 50–60 degrees C. and to the resulting solution there were added 5.1 grams of the hydrochloride of alpha-amino isobutyryl chloride. A homogeneous solution was formed. The reaction mixture was heated for 3 hours at 60–65 degrees C., hydrochloric acid gas being evolved, and then the mixture was heated for ½ hour at 80–100 degrees C. at which time very little hydrochloric acid gas was evolved. The hydrochloric acid gas and chloroform were then removed from the reaction mixture by heating at 100 degrees C. under reduced pressure. The residue was then extracted twice with 50 cc. portions of hot acetone. The acetone extract was evaporated to dryness under reduced pressure. The product was dispersible in isopropanol, acetone and petroleum ether. It was recovered from a mixture of these solvents by evaporation under reduced pressure. A white, waxy solid was obtained which was dispersible in water. The reaction mass contained a slight amount of unreacted stearic acid, some monostearin, and a mixture of the hydrochlorides of the mono- and di-esters of alpha amino-isobutyric acid with monostearin. Said amino carboxylic acid esters correspond to the formulae:

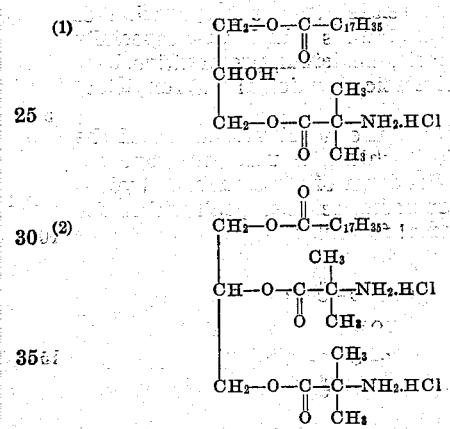

Example B 20 grams of the hydrochloride of alpha aminoacetyl chloride are reacted with 42 grams of monolaurin under substantially the same conditions as are set out hereinabove in Example A. The reaction product obtained contains a mixture of the hydrochlorides of the mono- and di-glycine esters of monolaurin, said compounds having the formulae:

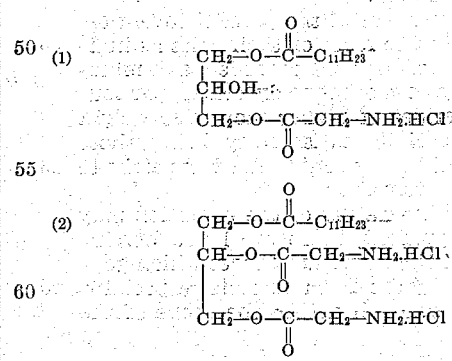

It will be understood that the substances may, for certain purposes, be employed in the form of impure reaction mixtures containing substantial proportions of the effective compounds. Where the substances are used for bactericidal, germicidal and like purposes, however, purification procedures may be employed to produce pure or substantially pure products. Those versed in the art are familiar with the types of purification methods which may be employed with advantage herein, particularly in the light of the disclosures made hereinabove.

The carboxylic acid acyl radicals represented by

in the general formula may be derived from various sources. Among such sources may be mentioned the straight chain and branched chain, saturated and unsaturated, carboxylic, aliphatic (including cycloaliphatic), fatty, aromatic, hydroaromatic, and araliphatic acids including acetic acid, propionic acid, butyric acid, caproic acid, pimelic acid, caprylic acid, capric acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oils, shark oil and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acyloxy carboxylic acids such as

acids such as i-hydroxy stearic acid, dihydroxy-palmitic acid, dihydroxy-stearic acid, dihydroxy-behenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermacetic, montan wax, coccerin, and carnauba wax and higher molecular weight carboxylic acids derived, by oxidation and other methods, from paraffin wax, petroleum and similar hydrocarbons; resinic and hydroaromatic acids such as hexahydrobenzoic acid, naphthenic acid and abietic acid; araliphatic and aromatic acids such as phthalic acid, benzoic acid, Twitchell fatty acids, naphthoic acid, pyridine carboxylic acid; hydroxy aromatic acids such as salicylic acid, hydroxy benzoic and naphthoic acids, and the like. It will be understood that mixtures of any two or more of said acids may be employed if desired and it will also be appreciated that said acids may contain substituent groups such as sulphate, sulphonic, nitrile, cyanogen, carbonyl, amide, amine, halogen, ketone and other groups. The acids may be employed as such or in the form of their anhydrides, esters including mono-, di- tri-glycerides and the like, and acyl halides, or, in general, in the form of any of their acylating compounds. Of particular utility, where the final compounds are used as antiseptics, bactericides, germicides and the like, are the unsubstituted fatty acids, containing from eight to fourteen carbon atoms and their acyl halides, lauric acid or its acyl halide or coconut oil mixed fatty acids or their acyl halides being especially satisfactory.

The amino-carboxylic acids which are or may be utilized in the preparation of the substances include, among those previously mentioned and others, alpha-amino acetic acid, alpha-amino propionic acid, alpha-amino butyric acid, beta-amino butyric acid, alpha-amino-n-valeric acid, alpha-amino isobutyric acid, alpha-amino isovaleric acid, phenylalanine, tyrosine, tryptophane, cystine, arginine, amino poly-carboxylic acids such as amino succinic acid, amino glutaric acid, amino citric acid, amino malonic acid, amino adipic acid, amino sebacic acid, and the like; the amino-carboxylic acids or mixtures thereof obtained by the hydrolysis of proteins or protein-containing materials such as gluten, soya bean flour and the like, whether by enzymatic action, by acids or by any other means. Other amino-carboxylic acids include the synthetic polypeptides as well as those resulting from the hydrolysis of proteins or protein-containing materials. Illustrative examples of such polypeptides are glycyl-glycine and leucyl-glycyl-glycine. It will be understood that mixtures of any two or more of the foregoing or other amino-carboxylic acids may be utilized in the preparation of the substances of the present invention. It will also be understood that any of these amino-carboxylic acids may be esterified with any of the monoglycerides disclosed hereinabove.

As indicated hereinabove, the compounds are best used in the form of salts, preferably in the form of substantially neutral salts or at a pH of about 6.7. The hydrochlorides are especially satisfactory but other salts may be employed, in certain instances, such as the sulphates, phosphates, nitrates, hydrobromides, hydroiodides, propionates, gluconates, sulphoacetates, sulphosuccinates, lactates, tartrates, citrates, salts of amino-carboxylic acids, and the like. The free esters of the amino-carboxylic acids generally possess limited solubility in water and, for that reason, the esters are used in the form of their salts, the salts possessing substantially greater water solubility. It is, however, within the broader scope of the invention to employ the free esters, using solvent media other than water or water alone, or by solubilizing the esters in any desired manner.

It will be understood that the numerous compounds disclosed herein will vary somewhat in bactericidal, germicidal, preservative, medicinal, bacteriostatic, antiseptic and fungicidal power or potency and that the effects will also vary depending upon the environment in which the compounds are used. The compounds are employed particularly in dilute aqueous or modified aqueous solutions, usually on the order of 0.1% to several thousandths of 1%. They may be used internally or externally and either as such or in conjunction with other agents having bactericidal, germicidal, antiseptic or like action. Particularly satisfactory use is in connection with dentifrices such as tooth powders, tooth pastes, liquid dentifrices, and mouth washes. In such cases, the proportions of the salts of the esters may, if desired, be somewhat higher than those set forth hereinabove. Their especial utility in dentifrices resides not only in the fact that they possess bactericidal, germicidal, and similar properties but, in addition, they are innocuous, non-toxic and relatively tasteless.

Among the bacteria, the metabolism of which is strongly inhibited by many of the compounds of the present invention, are the following: staphylococcus aureus, staphylococcus albus, sarcina lutea, micrococcus tetragenus, bacilli coli, aerobacter aerogenes, Ps. pyocyaneous, proteus vulgaris. Many of the substances are also effective against pneumococcus. In addition, the phenol coefficients of many of the compounds are substantially higher than that of phenol.

The term "higher," as used herein and in the claims to describe carboxylic and fatty acids and the like, will be understood to mean at least eight carbon atoms unless otherwise specifically stated.

Wherever the term "amino-carboxylic acid esters" or like expression is employed in the claims, it will be understood to cover the compounds irrespective of whether they are neutralized to form salts or are present as the free base.

While the invention has been described in detail, it is to be understood that the scope thereof is not to be limited other than is set forth in the claims.

What I claim as new and desire to protect by Letters Patent of the United States is:

1. Alpha-amino isobutyric acid esters of monoglycerides.
2. Hydrochlorides of alpha-amino isobutyric acid esters of higher molecular weight fatty acid monoglycerides.
3. The hydrochloride of the alpha-amino isobutyric acid ester of monolaurin.

BENJAMIN R. HARRIS.